(12) United States Patent
Feng et al.

(10) Patent No.: US 9,220,031 B2
(45) Date of Patent: Dec. 22, 2015

(54) ACCESS CONTROL METHOD AND DEVICE

(75) Inventors: Yuan Feng, Beijing (CN); Haiyang Quan, Beijing (CN); Jiayi Fang, Beijing (CN); Yi Zhao, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 219 days.

(21) Appl. No.: 13/978,402

(22) PCT Filed: Jan. 10, 2012

(86) PCT No.: PCT/CN2012/070176
§ 371 (c)(1),
(2), (4) Date: Jul. 4, 2013

(87) PCT Pub. No.: WO2012/094982
PCT Pub. Date: Jul. 19, 2012

(65) Prior Publication Data
US 2013/0279330 A1 Oct. 24, 2013

(30) Foreign Application Priority Data

Jan. 10, 2011 (CN) .......................... 2011 1 0003807

(51) Int. Cl.
H04W 28/02 (2009.01)
H04W 48/06 (2009.01)
H04W 92/14 (2009.01)

(52) U.S. Cl.
CPC .......... *H04W 28/0247* (2013.01); *H04W 48/06* (2013.01); *H04W 92/14* (2013.01)

(58) Field of Classification Search
None
See application file for complete search history.

(56) References Cited

U.S. PATENT DOCUMENTS

| 2010/0190499 A1* | 7/2010 | Wu |
| 2010/0302950 A1* | 12/2010 | Zhao .............................. 370/242 |
| 2011/0274040 A1* | 11/2011 | Pani et al. ..................... 370/328 |
| 2012/0157033 A1* | 6/2012 | Ou et al. .................... 455/404.1 |
| 2013/0051228 A1* | 2/2013 | Kim et al. ..................... 370/230 |

OTHER PUBLICATIONS

3GPP TSG RAN WG2 #72, Jacksonville, USA, Nov. 15-19, 2010, 11 pages.
3GPP TSG RAN WG2 #71, Oct. 11-15, 2010, Xi'an, China, 2 pages.
3GPP TSG RAN WG3 #69bis meeting, Xi an, China, Oct. 11-15, 2010, 4 pages.
3GPP TSG RAN WG2 Meeting #72BIS, Dublin, Ireland, Jan. 1-21, 2011, 3 pages.
International Search Report for PCT/CN2012/070176.

* cited by examiner

*Primary Examiner* — Bob Phunkulh
*Assistant Examiner* — George Atkins, Jr.
(74) *Attorney, Agent, or Firm* — Kilpatrick Townsend & Stockton LLP

(57) ABSTRACT

Disclosed is an access control method, for use in implementing improved access control. The method comprises: during a random access process, on the basis of a current load of a random access network (RAN) and a core network (CN) and of terminal or service information reported by a user equipment (UE), the RAN judging whether or not access to the RAN and to the CN is allowed; when access is denied by at least one network between the RAN and the CN, the RAN transmitting to the UE an instruction message having attached therein a backoff time corresponding to the access denying network. Also disclosed is a device for implementing the method.

6 Claims, 8 Drawing Sheets

ACCESS CONTROL METHOD AND DEVICE

This application is a US National Stage of International Application No. PCT/CN2012/070176, filed 10 Jan. 2012, designating the United States, and claiming priority to Chinese Patent Application No. 201110003807.7, filed with the State Intellectual Property Office of China on Jan. 10, 2011 and entitled "access control method and device", which is hereby incorporated by reference in its entirety.

FIELD OF THE INVENTION

The present invention relates to the field of communications and particularly to an access control method and device.

BACKGROUND OF THE INVENTION

M2M, the abbreviation of Machine to Machine, refers to a type of service for communication between one machine and another. The Internet of Things (IOT) refers to an application of M2M to a wide area network, particularly a mobile operator network, where a radio network of a mobile network operator acts as a platform to offer machine to machine radio data transmission services of industry users through specialized industry User Equipments (UEs) in numerous transmission schemes (Code Division Multiple Access (CDMA)/Global System for Mobile communication (GSM)/Short Message Service (SMS), etc.)

M2M/IOT services with a potential market are widely geographically distributed, and can be deployed at any network reachable location for real unattended watching instead of costly attended watching, which may be of both great significance and a great potential market value to information acquisition of electric power, water conservancy, oil exploitation, ore exploitation, environment conservancy, weather, tobacco, finance and other industries.

The use of a radio network for communication is one of preferred solutions for widely distributed M2M UEs, and data information acquired by sensors is typically transmitted over a General Packet Radio Service (GPRS) network for some existing industry applications, e.g., remote metering, water level monitoring, etc. There is a pressing demand for a radio network along with the development of M2M applications.

When a large number of M2M UEs access a network densely, there will be a considerable load on both a radio network and a core network, and consequently there will be inevitable congestion and an increase in failure ratio of inter-human communication. However, only one wait time is carried in a Radio Resource Control (RRC) Connection Rejection message in the prior art without distinguishing between a Core Network (CN) overload and a Radio Access Network (RAN) overload. On one hand, the wait time is so short, for example, 16 seconds in a Long Term Evolution (LTE) system, that the UEs will access the network too frequently, which may discourage network congestion from being alleviated; and on the other hand, CN congestion and RAN congestion can not be treated differently, thus resulting in a too rough granularity of access control.

SUMMARY OF THE INVENTION

Embodiments of the invention provide an access control method and device so as to perform better access control.

An access control method applicable to the RAN side includes:
determining, by a Radio Access Network (RAN) whether a UE is allowed for an access to the RAN and a CN according to current load conditions of the RAN and the CN and device or service information reported by the UE in an random access procedure; and
when an access to at least one of the RAN and the CN is rejected, sending, by the RAN, to the UE an indication message carrying a wait time corresponding to the access rejecting network.

A method for processing a message in an access procedure applicable to the UE side includes:
receiving, by a UE, an indication message carrying a wait time corresponding to an access rejecting network after sending an access request;
parsing, by the UE, the indication message for the wait time corresponding to the access rejecting network; and
rejecting, by the UE, a further access to the access rejecting network according to the wait time corresponding to the access rejecting network.

A device of radio access network includes:
a control module configured to determine whether a UE is allowed for an access to the RAN and a CN according to current load conditions of the RAN and the CN and device or service information reported by the UE in an random access procedure; and
an interface module, when an access to at least one of the RAN and the CN is rejected, configured to send to the UE an indication message carrying a wait time corresponding to the access rejecting network.

A user equipment includes:
an interface module configured to receive an indication message carrying a wait time corresponding to an access rejecting network after sending an access request;
a parsing module configured to parse the indication message for the wait time corresponding to the access rejecting network; and
a control module configured to reject a further access to the access rejecting network according to the wait time corresponding to the access rejecting network.

A core network device includes:
a control module configured to determine whether the device is overloaded, and if so, to determine a wait time for an overload; and
an interface module configured to send to an RAN an overload control message carrying the wait time for an overload.

In the embodiments of the invention, a Radio Access Network (RAN) determines access control for the RAN and a Core Network (CN) in an access procedure, and if there is an access rejecting network, that is the network is overloaded, the RAN carries in an indication message to a UE a wait time corresponding to the access rejecting network. In other words, the RAN can set targeted wait times respectively for overload conditions of the RAN and the CN to perform better access control and thus avoid as much as possible network congestion and a considerable delay in access of the UE.

DETAILED DESCRIPTION OF THE EMBODIMENTS

In embodiments of the invention, a Radio Access Network (RAN) determines access control for the RAN and a Core Network (CN) in an access procedure, and if there is an access rejecting network, that is, the network is overloaded, the RAN carries in an indication message to a UE a wait time corresponding to the access rejecting network. In other words, the RAN can set targeted wait times respectively for overload conditions of the RAN and the UN to perform better access control and thus avoid as much as possible network congestion and a considerable delay in access of the UE.

For a wait time in an RRC Connection Rejection message in the prior art, a wait time for a CN overload is not distinguished from a wait time for an RAN overload. In the embodiment, a wait time in an RRC Connection Rejection message in the prior art is taken as a wait time for an RAN overload, and a wait time for a CN overload is represented by adding a new Information Element (IE). Thus access control is performed respectively on the different networks to thereby offer a finer granularity of access control. Also in order to extend a range of the wait time, the wait time can be a value different from a wait time indicated in the message, for example, can be the power of the wait time indicated in the message with 2 being a base, etc.

Figure 1:
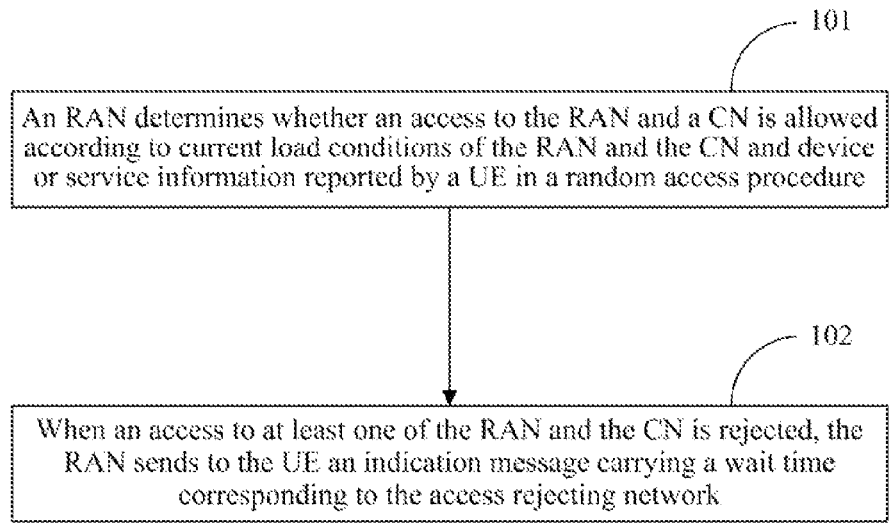
FIG. 1 is a general flow chart of an access control method at the network side according to an embodiment of the invention.

Referring to FIG. 1, a general flow of an access control method at the network side in the embodiment is as follows.

Step 101: A Radio Access Network (RAN) determines whether an access to the RAN and a CN is allowed according to current load conditions of the RAN and the CN and device or service information reported by a UE in a random access procedure. This determination process may take place after an RRC Connection Request message is received or may take place after an RRC Connection Setup Complete message is received. The UE may report the device or service information in the RRC Connection Request message or may report the device or service information in the RRC Connection Setup Complete message.

Step 102: When an access to at least one of the RAN and the CN is rejected, the RAN sends to the UE an indication message carrying a wait time corresponding to the access rejecting network. If the CN is overloaded, that is, an access to the CN is rejected, the carried wait time includes a wait time for a CN overload; if the RAN is overloaded, that is, an access to the RAN is rejected, the carried wait time includes a wait time for an RAN overload; or if both the RAN and the CN are overloaded, the carried wait times include the wait time for a CN overload and the wait time for an RAN overload. If access control is determined for the access request and neither the RAN nor the CN is overloaded (that is, both the RAN and the CN allow an access thereto), the RAN sends an RRC Connection Setup message to the UE; or if access control is determined after an RRC connection setup is completed and neither the RAN nor the CN is overloaded, the RAN operates at it is without sending a RRC Connection Release message to the UE.

As opposed to the network side, an implementation method at the UE side in an access procedure will be introduced.

Figure 2:
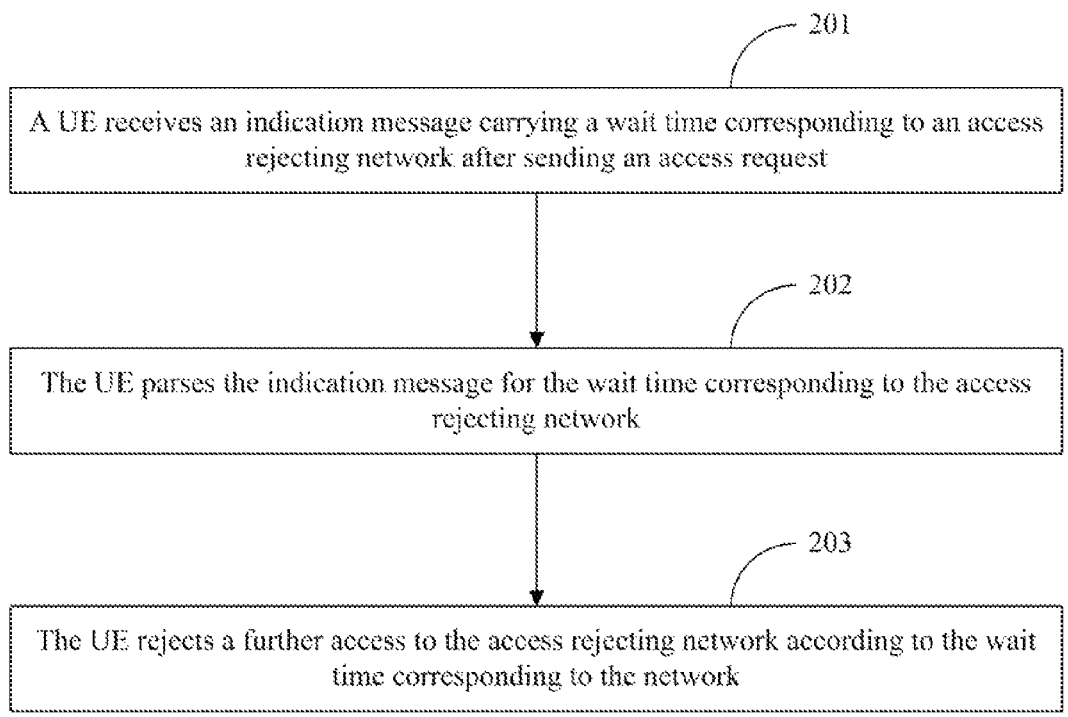
FIG. 2 is a general flow chart of an access control method at the UE side according to an embodiment of the invention.

Referring to FIG. 2, a general flow of an access control method at the UE side in the embodiment is as follows.

Step 201: A UE receives an indication message carrying a wait time corresponding to an access rejecting network after sending an access request. The wait time includes a wait time for an RAN overload, or a wait time for a CN overload, or both the wait time for an RAN overload and the wait time for a CN overload.

Step 202: The UE parses the indication message for the wait time corresponding to the access rejecting network.

Step 203: The UE accesses the access rejecting network according to the wait time corresponding to the network. The UE performs access control according to the wait time for an RAN overload upon discovering the presence of the wait time for an RAN overload in the indication message. The UE performs access control according to the wait time for a CN overload upon discovering the presence of the wait time for a CN overload in the indication message. The UE performs access control according to the wait times for RAN and CN overloads upon discovering the presence of the wait times for RAN and CN overloads in the indication message.

An access procedure involves interaction between an RAN and a UE, and an implementation process of an access control will be introduced below in connection to both the RAN and UE sides.

Figure 3:
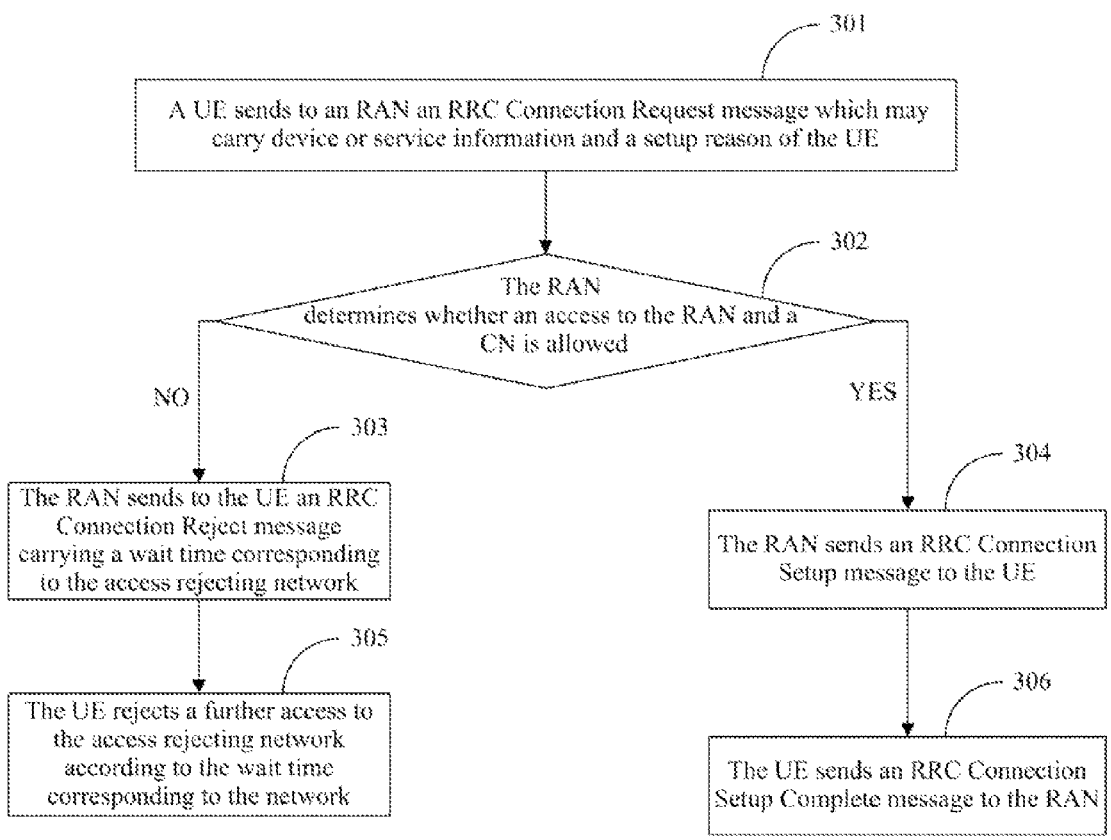
FIG. 3 is a flow chart of an access control method at both the RAN side and the UE side according to an embodiment of the invention.

Referring to FIG. 3, a flow of an access control method at both the RAN side and the UE side in the embodiment is as follows.

Step 301: A UE sends to an RAN an RRC Connection Request message which may carry device or service information and a setup reason of the UE. The device or service information includes one of the following information: an indicator of whether it is a low-priority access UE or service; an indicator of whether it is a roaming UE as well as specific roaming sub-class information; an indicator of whether it is a time-tolerable UE or service; an indicator of whether it is a time-controllable UE or service; and an indicator of whether it is a small-data-amount UE or service. The device or service information may further include other device or service-related information which will not be enumerated here. The setup reason includes one of the following reasons: an emergency call initiated by the UE, an access of the called UE (mt-Access), a high-priority access, signalling initiated by the UE (mo-Signalling), data transmission (mo-Data) and a low-priority access, where different setup reasons can correspond to different access priorities.

Step 302: The RAN determines whether the UE is allowed for an access to the RAN and a CN according to the device or service information and the setup reason of the UE and obtained current load information of the networks and proceeds to the step 303 when the UE is rejected for an access to at least one of the RAN and the CN; otherwise, the RAN proceeds to the step 304. The current load information of the networks obtained in the RAN includes load information of the RAN and load information of the CN, that is, load conditions of the RAN and the CN. The load information of the CN may be sent to the RAN from a Mobility Management Entity (MME) in an Overload Start message or configured to the RAN by an Operation, Administration and Maintenance (OAM) entity. The load information of the CN includes, for example, all of low-priority access UEs or services being rejected for a non-emergent call; all of caller data service and low-priority access UEs or services being rejected; all of caller signalling services and low-priority access UEs or services being rejected for a non-emergent call; and only an emergency service and a callee access being allowed. In the embodiment, the load information of the CN may further include a wait time for a CN overload, and the wait time may correspond to a rejecting reason.

Step 303: The RAN sends to the UE an RRC Connection Reject message carrying a wait time corresponding to the access rejecting network and proceeds to the step 305.

Before the step 303, the RAN may determine a wait time corresponding to the access rejecting network upon determining that there is an overloaded network. The MME sends a reference value of the wait time to the RAN in the Overload Start message, or the OAM entity configures a reference value of the wait time to the RAN. The RAN determines a final wait time from the reference value. Here there are numerous implementations, for example, the RAN takes the reference value directly as the wait time; or the RAN generates a random number and takes the power of the random number with the reference value being a base as the wait time; or the reference value is a range, e.g., 1-3600, and the RAN generates a random number in the reference range and takes the random number as the wait time; or the RAN generates a random number no less than the reference value and takes the random number as the wait time. There are other possible wait time determinations applicable to the embodiment as long as a load stress on the network side can be alleviated. Wait times for both RAN and CN overloads can be determined as above. Preferably, the wait time in the embodiment is in seconds.

Step 304: The RAN sends an RRC Connection Setup message to the UE and proceeds to the step 306.

Step 305: The UE performs network access control according to the wait time corresponding to the access rejecting network, for example, will reject a further access to the network.

Step 306: The UE sends an RRC Connection Setup Complete message to the RAN.

In the step 305, if the UE receives the RRC Connection Reject message carrying a valid wait time of the CN, the UE may transfer the wait time for a CN overload to all internal Non-Access Stratum (NAS) for processing. If the UE receives the RRC Connection Reject message carrying a wait time for an RAN overload, the UE may start and set a T302 timer according to the wait time for an RAN overload. The UE controls the access to be halted through the NAS and the T302 timer. The T302 timer is a timer specified in the standard, and in the existing standard, there is only one wait time in the Connection Reject message, and the UE has to start the T302 timer according to the wait time upon reception of the RRC Connection Reject message and can not reinitiate an access attempt until expiration. In the invention, a wait time is newly added in this message. The original wait time still corresponds to the T302 timer.

There is another implementation of the embodiment in which the RAN determines access control for the RAN according to the device or service information and the setup reason of the UE and the obtained current load information of the network, and if an access is rejected, the RAN sends to the UE an RRC Connection Reject message carrying a wait time for an RAN overload, and then the UE performs a wait process; or if an access is allowed, the RAN sends an RRC Connection Setup message to the UE and sets up an RRC connection with the UE, and after the setup is completed, the RAN determines access control for the CN, and if an access to the CN is rejected, the RAN sends an RRC Connection Release message to the UE and disconnects the RRC connection with the UE; otherwise, the RAN performs a registration process with the CN.

Since the RAN can determine access control in different phases, there are numerous indicators of whether to allow an access to the RAN and the CN, and access control can be determined by distinguishing a single-CN node overload or without distinguishing a single-CN node overload, there are numerous implementations of the entire access process, which will be detailed below in connection with several embodiments. Particularly, "without distinguishing a single-CN node overload" refers to that a CN overload with all of MMEs in the entire MME pool being overloaded is not distinguished from a CN overload with only a part of MMEs being overloaded, that is, the RAN determines the entire CN to be overloaded upon reception of load information of n MMEs, where the preconfigured parameter n represents a lower number than the total number of MMEs in the MME pool connected with the RAN. "Distinguishing a single-CN node overload" refers to that the RAN determines an MME to be overloaded upon reception of load information of that MME and determines the other MMEs in the MME pool not to be overloaded upon reception of no load information of the other MMEs.

Figure 4:
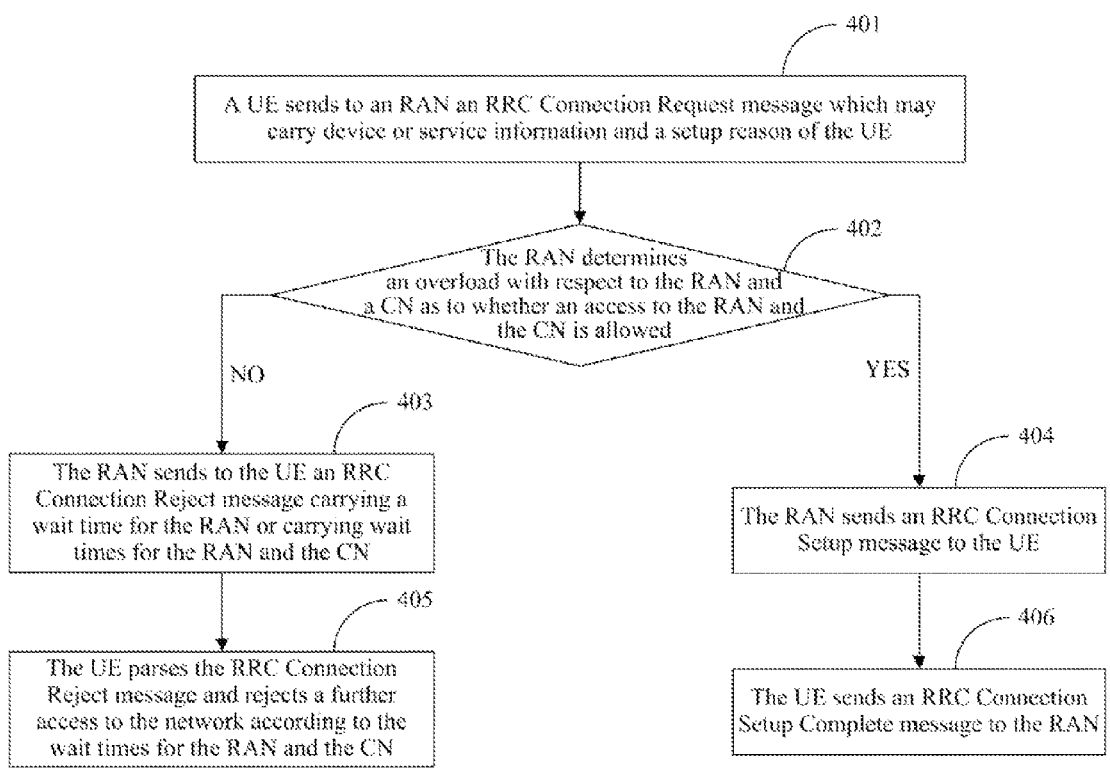
FIG. 4 is a flow chart of an access control method without distinguishing a single-CN node overload but only with a wait time according to an embodiment of the invention.

Referring to FIG. 4, a flow of an access control method without distinguishing a single-CN node overload but only with a wait time in this embodiment is as follows.

Step 401: A UE sends to an RAN an RRC Connection Request message which may carry device or service information and a setup reason of the UE.

Step 402: The RAN determines whether an access to the RAN and a CN is allowed according to the device or service information and the setup reason of the UE and obtained current load information of the networks and proceeds to the step 403 when an access to at least one of the RAN and the CN is rejected; otherwise, the RAN proceeds to the step 404. Particularly, the entire CN is determined to be overloaded as long as the current load information of the networks obtained in the RAN includes overload control information of any MME, and if the setup reason of the UE satisfies an access reason to reject the access in the overload control information of the MME, the access request of the UE is rejected. In this embodiment, load information of an MME includes overload control information of the MME.

Step 403: The RAN sends to the UE an RRC Connection Reject message carrying a wait time for an RAN overload or carrying wait times respectively for an RAN overload and for a CN overload and proceeds to the step 405.

Step 404: The RAN sends an RRC Connection Setup message to the UE and proceeds to the step 406.

Step 405: The UE parses the RRC Connection Reject message and rejects a further access to the networks according to the wait times for an RAN overload and for a CN overload.

Step 406: The UE sends an RRC Connection Setup Complete message to the RAN.

In the step 403, if the CN is not overloaded (that is, an access to the CN is allowed) and the RAN is overloaded (that is, an access to the RAN is rejected), the RRC Connection Reject message does not carry the wait time for a CN overload but only carries the wait time for an RAN overload. Then in the step 405, the UE determines that the CN is not overloaded and the RAN is overloaded upon discovering the presence of only the wait time for an RAN overload and simply performs a process according to the wait time for an RAN overload, e.g., starts and sets a T302 timer, etc.

If the CN is overloaded, the RRC Connection Reject message carries the wait time for a CN overload. In the step 405, the UE transfers the wait time for a CN overload to an internal NAS for processing upon discovering the presence of the wait time for a CN overload.

In the case that both the CN and the RAN are not overloaded, the wait time for an RAN overload can be set to a specified value, and the UE ignores the wait time for an RAN overload or waits according to the wait time for an RAN overload upon discovering the wait time for an RAN overload to be a specified value which can be set to least wait time value specified by a system, and different least wait time values may be specified by different systems.

In the case that the CN is overloaded, if the RAN is also overloaded, the wait time for an RAN overload is not a specified value, and the UE performs a process according to the wait time for an RAN overload. When both the CN and the RAN are overloaded, the UE obtains the wait times for RAN and CN overloads and has an RRC layer in the UE maintain a T302 timer and an NAS therein maintain a timer corresponding to the wait time for a CN overload. The RRC layer notifies the NAS that the T302 timer is started or expires. When the T302 timer is validated, the NAS prohibits all of access requests to be initiated. When the T302 timer is invalidated (is not started or expires), the NAS decides whether to prohibit an access from being initiated according to the timer corresponding to the wait time for a CN overload and the setup reason. Specifically, the UE is allowed for an access at the NAS, and whether the UE ultimately can be allowed for an access will be further decided under a rule of the Access Stratum (AS) layer.

In order to alleviate an access load at the network side, whether the access is allowed to be initiated can alternatively be determined at the UE side. For example, the UE records a setup reason corresponding to an RRC connection corresponding to the indication message upon receiving the indication message and knowing from the indication message that the CN is overloaded. When there is another access to be performed in the range of the wait time, if a setup reason for the current access request has an access priority no higher than that of the recorded setup reason, the access is prohibited, or if the setup reason for the current access request has a higher access priority than that of the recorded setup reason, the timer corresponding to the wait time is invalidated, and an access request is sent.

Figure 5:
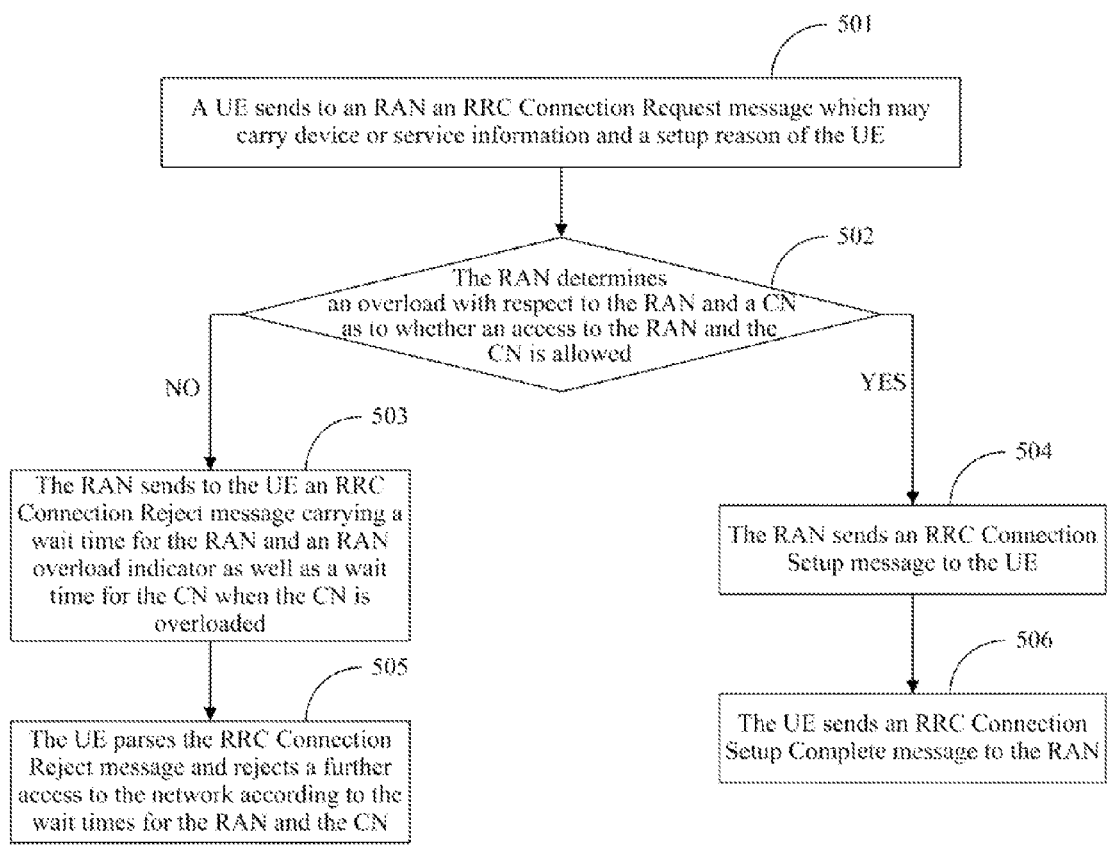
FIG. 5 is a flow chart of an access control method without distinguishing a single-CN node overload but with a wait time and an RAN overload indicator according to an embodiment of the invention.

Referring to FIG. 5, a flow of an access control method without distinguishing a single-CN node overload but with a wait time and an RAN overload indicator in this embodiment is as follows.

Step 501: A UE sends to an RAN an RRC Connection Request message which may carry device or service information and a setup reason of the UE.

Step 502: The RAN determines whether an access to the RAN and a CN is allowed according to the device or service information and the setup reason of the UE and obtained current load information of the networks and proceeds to the step 503 when an access to at least one of the RAN and the CN is rejected; otherwise, the RAN proceeds to the step 504. Particularly, the entire CN is determined to be overloaded as long as the current load information of the networks obtained in the RAN includes overload control information of any MME, and if the setup reason of the UE satisfies an access reason to reject the access in the overload control information of the MME, the access request of the UE is rejected.

Step 503: The RAN sends to the UE an RRC Connection Reject message carrying a wait time for an RAN overload and an RAN overload indicator as well as a wait time for a CN overload when the CN is overloaded and proceeds to the step 505. Particularly, the RAN overload indicator may indicate whether the RAN is overloaded and may further indicate whether the wait time for an RAN overload is valid, and when the RAN overload indicator is an RAN overload indicator indicating the RAN to be overloaded, it also indicate the carried wait time for an RAN overload to be valid; or when the RAN overload indicator is an RAN overload indicator indicating the RAN not to be overloaded, it also indicates the carried wait time for an RAN overload to be invalid.

Step 504: The RAN sends an RRC Connection Setup message to the UE and proceeds to the step 506.

Step 505: The UE parses the RRC Connection Reject message and rejects a further access to the networks according to the RAN overload indicator and the wait times for an RAN overload and for a CN overload.

Step 506: The UE sends an RRC Connection Setup Complete message to the RAN.

In the step 503, when the CN is overloaded and the RAN is not overloaded, the carried wait time includes the wait time for a CN overload, and the RAN overload indicator is an RAN overload indicator indicating the RAN not to be overloaded. In this case, the RRC Connection Reject message may also carry the wait time for an RAN overload although the wait time for an RAN overload is invalid. Then in the step 505, the UE transfers the wait time for a CN overload to an internal NAS for processing upon discovering the presence of the wait time for a CN overload and ignores the wait time for an RAN overload upon discovering the RAN overload indicator to be an RAN overload indicator indicating the RAN not to be overloaded. When the RAN is overloaded and the CN is not overloaded, the wait time includes the wait time for an RAN overload, and the RAN overload indicator is an RAN overload indicator indicating the RAN to be overloaded. In this case, the RRC Connection Reject message does not carry the wait time for a CN overload. Then in the step 505, the UE performs a process according to the wait time for an RAN overload upon discovering the RAN overload indicator to be an RAN overload indicator indicating the RAN to be overloaded and will not perform a process with respect to the wait time for a CN overload upon discovering the absence of the wait time for a CN overload.

When both the RAN and the CN are overloaded, the carried wait times include the wait times for an RAN overload and for a CN overload, and the RAN overload indicator is an RAN overload indicator indicating the RAN to be overloaded. Then in the step 505, the UE performs a process according to the wait time for an RAN overload upon discovering the RAN overload indicator to be an RAN overload indicator indicating the RAN to be overloaded and transfers the wait time for a CN overload to the internal NAS for processing upon discovering the presence of the wait time for a CN overload. In this case, the UE obtains the wait times for an RAN overload and for a CN overload and has an RRC layer in the UE maintain a T302 timer corresponding to the wait time for an RAN overload and the NAS therein maintain a timer corresponding to the wait time for a CN overload. The RRC layer notifies the NAS that the T302 timer is started or expires. When the T302 timer is validated, the NAS prohibits all of access requests to be initiated. When the T302 timer is invalidated (is not started or expires), the NAS decides whether to prohibit an access from being initiated according to the timer corresponding to the wait time for a CN overload and the setup reason.

With a single-CN node overload being distinguished, the RAN may determine whether an MME corresponding to the UE is overloaded and thus performs a slightly different access control process. Moreover, the RAN may determine the corresponding MME from a System Architecture Evolution (SAE)-Temporary Mobile Subscriber Identity (S-TMSI) in the RRC Connection Request message or determine the corresponding MME from a Globally Unique MME Identifier (GUMMEI) in the RRC Connection Setup Complete message.

Figure 6:
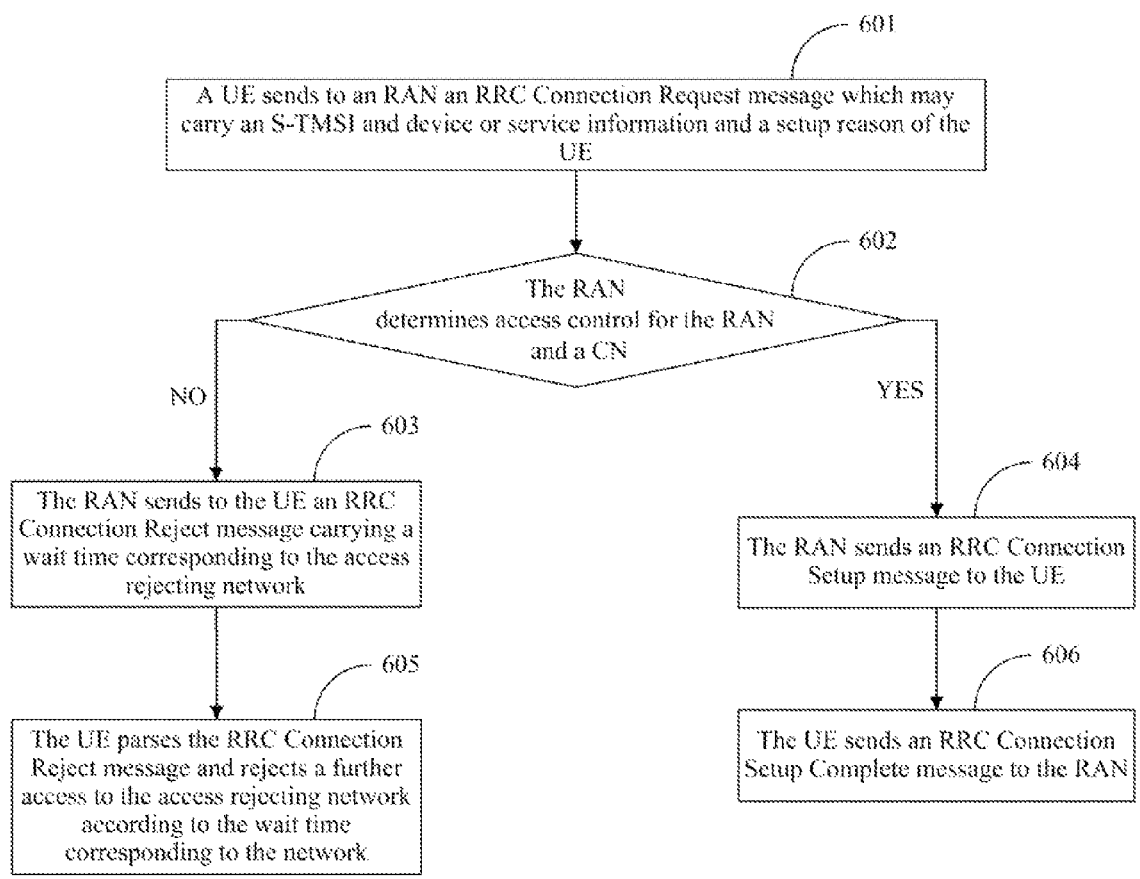
FIG. 6 is a flow chart of an access control method by distinguishing a single-CN node overload and reporting an S-TMSI according to an embodiment of the invention.

Referring to FIG. 6, a flow of an access control method by distinguishing a single-CN node overload and reporting an S-TMSI in this embodiment is as follows.

Step 601: A UE sends to an RAN an RRC Connection Request message which may carry an S-TMSI and device or service information and a setup reason of the UE.

Step 602: The RAN determines an access control for the RAN according to the device or service information and the setup reason of the UE and obtained current load information of the networks (including the RAN and a CN) and determines access control for an MME indicated by the S-TMSI, and if the MME is overloaded and prohibits an access for the RRC setup reason of the UE, the RAN determines the CN to be overloaded; otherwise, the RAN determines the CN not to be overloaded, and the RAN proceeds to the step 603 when an access to at least one of the RAN and the CN is rejected; otherwise, the RAN proceeds to the step 604.

Step 603: The RAN sends to the UE an RRC Connection Reject message carrying a wait time corresponding to the access rejecting network and proceeds to the step 605. Particularly, for contents of and a process to parse the RRC Connection Reject message, reference may be made to the embodiment illustrated in FIG. 5.

Step 604: The RAN sends an RRC Connection Setup message to the UE and proceeds to the step 606.

Step 605: The UE parses the RRC Connection Reject message and rejects a further access to the access rejecting network according to the wait time corresponding to the network.

Step 606: The UE sends an RRC Connection Setup Complete message to the RAN.

Figure 7:
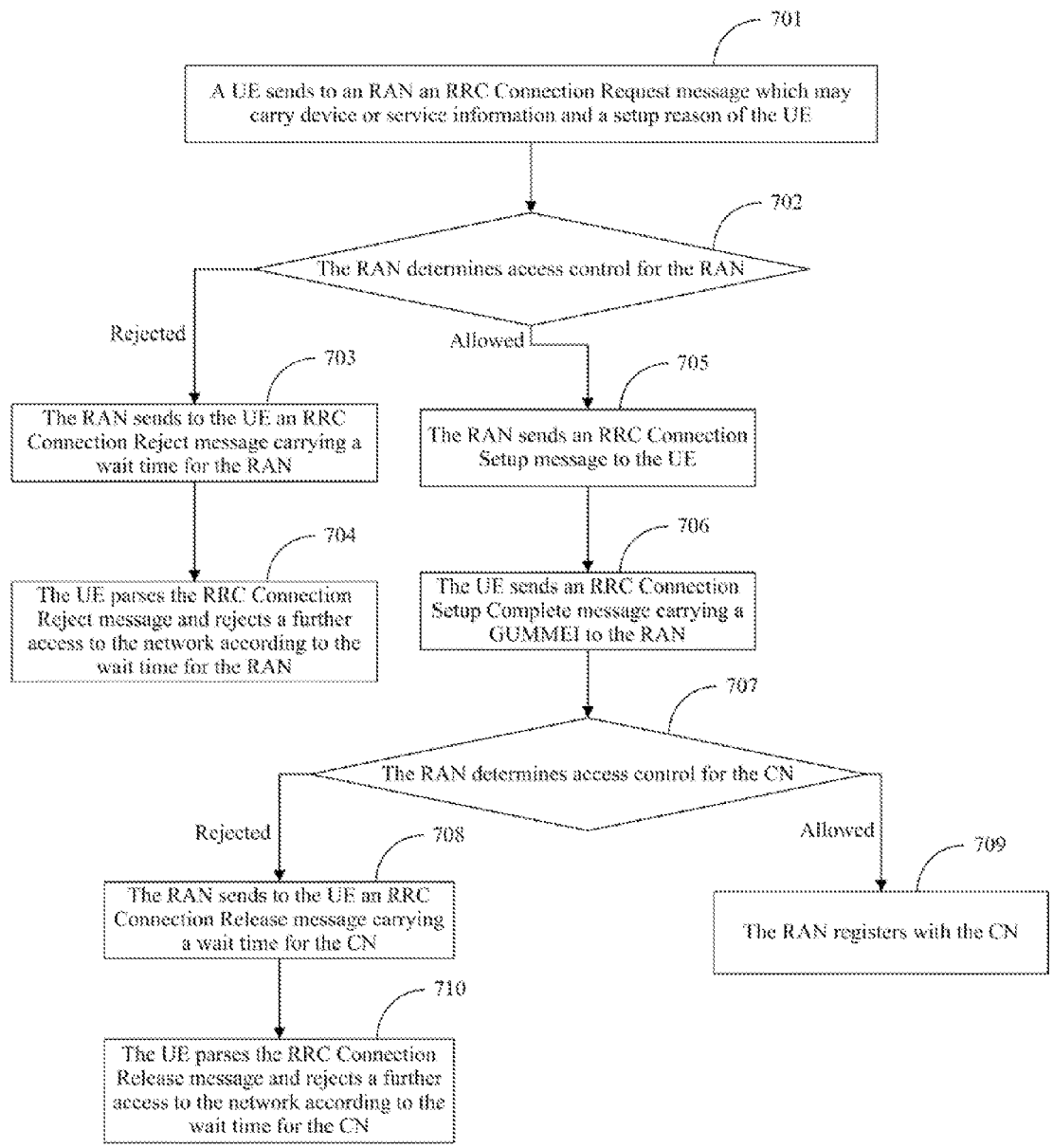
FIG. 7 is a flow chart of an access control method by distinguishing a single-CN node overload and reporting a GUMMEI according to an embodiment of the invention.

Referring to FIG. 7, a flow of an access control method by distinguishing a single-CN node overload and reporting a GUMMEI in this embodiment is as follows.

Step 701: A UE sends to an RAN an RRC Connection Request message which may carry device or service information and a setup reason of the UE.

Step 702: The RAN determines an access control for the RAN according to the device or service information and the setup reason of the UE and obtained load information of the RAN and proceeds to the step 703 when the RAN is overloaded; otherwise, the RAN proceeds to the step 705.

Step 703: The RAN sends to the UE an RRC Connection Reject message carrying a wait time for an RAN overload.

Step 704: The UE parses the RRC Connection Reject message and rejects a further access to the network according to the wait time for an RAN overload.

Step 705: The RAN sends an RRC Connection Setup message to the UE.

Step 706: The UE sends an RRC Connection Setup Complete message carrying a GUMMEI to the RAN.

Step 707: The RAN determines an access control for a CN according to the device or service information and the setup reason of the UE and obtained load information of the CN and proceeds to the step 708 when the CN is overloaded; otherwise, the RAN proceeds to the step 709.

Step 708: The RAN sends to the UE an RRC Connection Release message carrying a wait time for a CN overload and proceeds to the step 710.

Step 709: The RAN registers with the CN.

In the step 707, the RAN determines whether there is an S1 interface between an MME corresponding to the GUMMEI and the RAN and whether the MME allows the UE for an access.

The RAN firstly determines whether there is an S1 interface between the MME corresponding to the GUMMEI and the RAN, and if there is an S1 interface, the RAN further determines whether there is overload control information of the MME, and if there is overload control information, the RAN further determines whether the setup reason requested by the UE belongs to setup reasons to reject an access in the overload control information, and if so, the RAN proceeds to the step 708. If there is an S1 interface and there is no overload control information, that is, the MME is not overloaded, the RAN proceeds to the step 709 for the MME. If there is no S1 interface, the RAN searches a MME pool for a non-overloaded MME and proceeds to the step 709 or finds out an MME which is overloaded but does not reject the setup reason of the UE, and if all of MMEs in the MME pool are overloaded and reject the setup reason of the UE, the RAN proceeds to the step 708.

Step 710: The UE parses the RRC Connection Release message and rejects a further access to the network according to the wait time for a CN overload.

An implementation process of access control has been known from the foregoing description, and this process is generally performed by the RAN and the UE, so internal structures and functions of the RAN and the UE will be introduced below.

Figure 8:
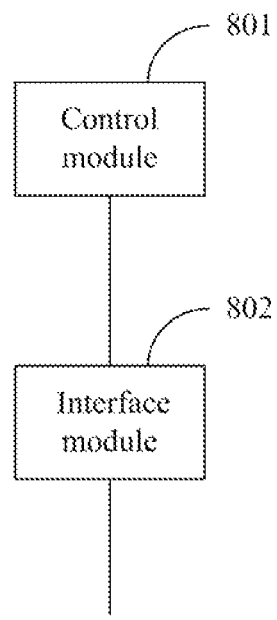
FIG. 8 is a structural diagram of a device of radio access network according to an embodiment of the invention.

Referring to FIG. 8, a device of radio access network in this embodiment includes a control module 801 and an interface module 802. The device of radio access network may be a NodeB (e.g., an evolved NodeB (eNB)) or a Radio Network Controller (RNC) or other access devices.

The control module 801 is configured to generate various messages and to determine whether an access to the RAN and a CN is allowed according to current load conditions of the RAN and the CN and device or service information reported by a UE in a random access procedure. The control module 801 is further configured to determine a wait time for a CN overload by determining by itself for the UE the wait time for a CN overload according to the current load condition of the network and the information reported by the UE or by determining for the UE the wait time for a CN overload from a wait time, indicated by an MME or an OAM entity, which is further randomized, and to determine the wait time for an RAN overload by determining by itself for the UE the wait time for an RAN overload. Specifically, an access request carries the device or service information and a setup reason of the UE. The control module 801 determines whether the RAN is overloaded, and if so, it determines the RAN to be overloaded; otherwise, it determines the RAN not to be overloaded; and it determines whether the UE is allowed for an access to the CN according to the device or service information and the setup reason of the UE and an overload indicator for the CN, and if so, it determines the CN not to be overloaded; otherwise, it determines the CN to be overloaded.

The device or service information includes one of the following information: an indicator of whether it is a low-priority access UE or service; an indicator of whether it is a roaming UE as well as specific roaming sub-class information; an indicator of whether it is a time-tolerable UE or service; an indicator of whether it is a time-controllable UE or service; and an indicator of whether it is a small-data-amount UE or service. The device or service information may further include other device or service-related information.

When an access to at least one of the RAN and the CN is rejected, the interface module 802 connected with the UE and the CN is configured to send to the UE an indication message carrying a wait time corresponding to the access rejecting network.

Without distinguishing a single-CN node overload, the RAN sends the indication message carrying the wait time corresponding to the access rejecting network in an RRC Connection Reject message. With a single-CN node overload being distinguished, if the access request does not carry a UE identifier corresponding to an MME with which the UE registers, the following steps are further included: an RRC Connection Setup Complete message sent from the UE is received; and if the RRC Connection Setup Complete message carries the UE identifier corresponding to the MME with which the UE registers and the MME corresponding to the UE identifier is overloaded and has an S1 interface with the RAN, or all of MMEs in a MME pool are overloaded, then the RAN sends the indication message carrying the wait time corresponding to the access rejecting network in an RRC Connection Release message; or if the access request carries the UE identifier corresponding to the MME with which the UE registers, the RAN sends the indication message carrying the wait time corresponding to the access rejecting network in an RRC Connection Reject message.

There are numerous forms of the indication message, and which network is overloaded and a corresponding wait time may be indicated to the UE in different information Elements (IEs). For example, the RRC Connection Rejection message further includes an RAN overload indicator indicating whether the RAN is overloaded; when the CN is overloaded and the RAN is not overloaded, the wait time corresponding to the access rejecting network includes a wait time for a CN overload, and the RAN overload indicator is an RAN overload indicator indicating the RAN not to be overloaded; when the RAN is overloaded and the CN is not overloaded, the wait time includes the wait time for an RAN overload, and the RAN overload indicator is an RAN overload indicator indicating the RAN to be overloaded; and when both the RAN and the CN are overloaded, the wait times include the wait times for RAN and CN overloads, and the RAN overload indicator is an RAN overload indicator indicating the RAN to be overloaded.

Alternatively, the RRC Connection Rejection message further includes the wait time for an RAN overload, which is a specified value, when the RAN is not overloaded. In other words, if the CN is not overloaded (that is, an access to the CN is allowed) and the RAN is overloaded (that is, an access to the RAN is rejected), then the RRC Connection Rejection message does not carry the wait time for a CN overload but only the wait time for an RAN overload. If the CN is overloaded and the RAN is not overloaded, the RRC Connection Rejection message carries the wait time for a CN overload and the wait time for an RAN overload, but the wait time for an RAN overload is a specified value. If both the CN and the RAN are overloaded, the RRC Connection Rejection message carries the wait time for a CN overload and the wait time for an RAN overload, and the wait time for an RAN overload is not a specified value.

Figure 9:
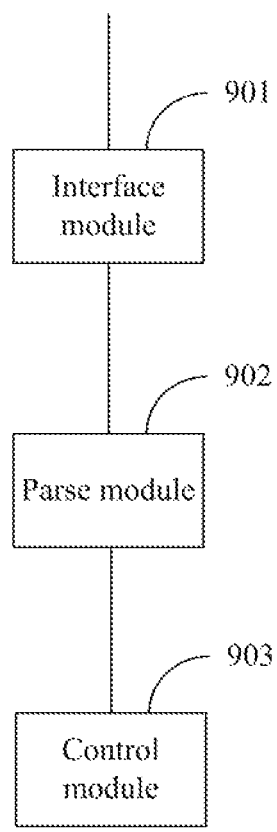
FIG. 9 is a general structural diagram of a UE according to an embodiment of the invention.

Referring to FIG. 9, a user equipment in this embodiment includes an interface module 901, a parse module 902 and a control module 903.

The interface module 901 is configured to receive an indication message carrying a wait time corresponding to an access rejecting network after sending an access request. The wait time corresponding to the access rejecting network includes a wait time for an RAN overload or a wait time for a CN overload or both the wait time for an RAN overload and the wait time for a CN overload. The interface module 901 receives the indication message carrying the wait time corresponding to the access rejecting network in an RRC Connection Reject message; and the interface module 901 is further configured to send an RRC Connection Setup Complete message. The RRC Connection Setup Complete message may carry a UE identifier corresponding to an MME with which the UE registers, and then the interface module 901 may receive the indication message carrying the wait time corresponding to the access rejecting network in an RRC Connection Release message; and if the access request carries the UE identifier corresponding to the MME with which the UE registers, the interface module 901 receives the indication message carrying the wait time corresponding to the access rejecting network in an RRC Connection Reject message.

The parse module 902 is configured to parse the indication message for the wait time corresponding to the access rejecting network.

The control module 903 is configured to reject a further access to the access rejecting network according to the wait time corresponding to the network. Specifically, the control module 903 may start and set a T302 timer according to the wait time for an RAN overload, and an NAS part in the control module 903 may perform a wait process according to the wait time for a CN overload.

Particularly, the control module 903 is configured to determine the CN not to be overloaded and the RAN to be overloaded upon discovering the presence of only the wait time for an RAN overload in the RRC Connection Reject message and to simply perform a process according to the wait time for an RAN overload, for example, start and set the T302 timer, etc., and to reject a network access attempt of the UE when the T302 timer is started.

The control module 903 transfers the wait time for a CN overload to the internal NAS for processing upon discovering the wait time for a CN overload to be carried in the RRC Connection Reject message and to reject a network access attempt of the UE when a timer corresponding to the wait time for a CN overload is started.

The control module 903 ignores the wait time for an RAN overload or performs a process with respect to the wait time for an RAN overload upon discovering the wait time for an RAN overload to be carried in the RRC Connection Reject message and to be a specified value.

When the control module 903 discovers the wait time for a CN overload and the wait time for an RAN overload to be carried in the RRC Connection Reject message and the wait time for an RAN overload not to be a specified value, an RRC layer in the control module 903 maintains the T302 timer, and the NAS maintains the timer corresponding to the wait time for a CN overload. The RRC layer notifies the NAS that the T302 timer is started or expires. When the T302 timer is validated, the NAS prohibits all of access requests to be initiated. When the T302 timer is invalidated (is not started or expires), the NAS decides whether to prohibit an access from being initiated according to the timer corresponding to the wait time for a CN overload and a setup reason.

The interface module 901 may receive the indication message carrying the wait time for a CN overload in an RRC Connection Release message. The control module 903 transfers the wait time for a CN overload to the internal NAS for processing upon discovering the wait time for a CN overload to be carried in the RRC Connection Release message and to reject a network access attempt of the UE when the timer corresponding to the wait time for a CN overload is started.

The RRC Connection Reject message further includes an RAN overload indicator indicating whether the RAN is overloaded. The control module 903 transfers the wait time for a CN overload to the internal NAS for processing upon discovering the presence of the wait time for a CN overload and ignores the wait time for an RAN overload upon discovering the RAN overload indicator to be an RAN overload indicator indicating the RAN not to be overloaded.

The control module 903 performs a process according to the wait time for an RAN overload upon discovering the RAN overload indicator to be an RAN overload indicator indicating the RAN to be overloaded and will not perform a process with respect to the wait time for a CN overload upon discovering the absence of the wait time for a CN overload.

The control module 903 performs a process according to the wait time for an RAN overload upon discovering the RAN overload indicator to be an RAN overload indicator indicating the RAN to be overloaded and rejects a network access attempt of the UE when the T320 timer is started, and transfers the wait time for a CN overload to the internal NAS for processing upon discovering the presence of the wait time for a CN overload. In this case, the control module 903 obtains the wait times for an RAN overload and for a CN overload, the RRC layer in the control module 903 maintains the T302 timer, and the NAS maintains the timer corresponding to the wait time for a CN overload. The RRC layer notifies the NAS that the T302 timer is started or expires. When the T302 timer is validated, the NAS prohibits all of access requests to be initiated. When the T302 timer is invalidated (is not started or expires), the NAS decides whether to prohibit an access from being initiated according to the timer corresponding to the wait time for a CN overload and the setup reason.

Figure 10:
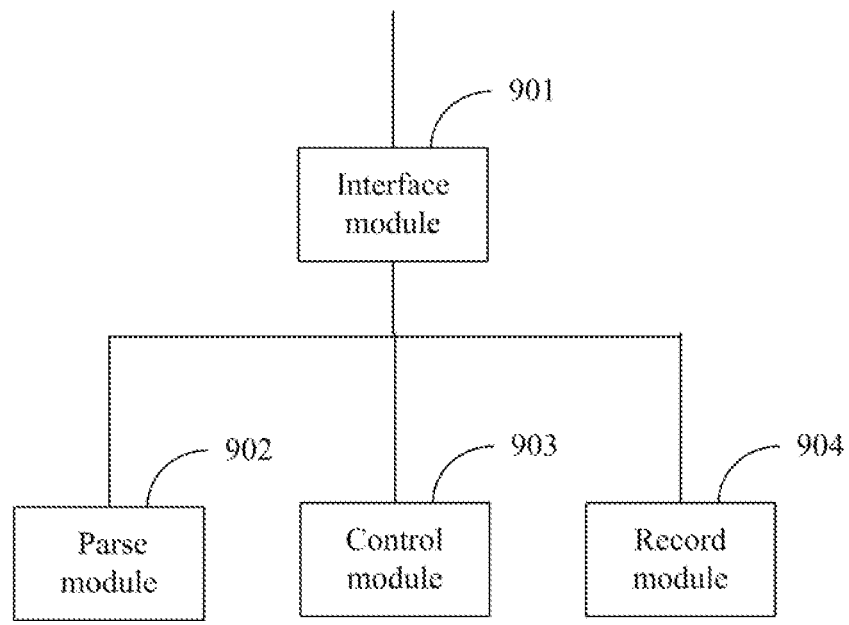
FIG. 10 is a detailed structural diagram of a UE according to an embodiment of the invention.

Preferably, when the CN is overloaded, the user equipment further includes a record module 904 with reference to FIG. 10. The record module 904 is configured to record a setup reason corresponding to an RRC connection corresponding to the indication message upon discovering the indication message to carry the wait time for a CN overload. When there is another access to be performed when the timer corresponding to the wait time for a CN overload is started, if a setup reason for the current access request has an access priority no higher than that of the recorded setup reason, the control module 903 prohibits the access, or if the setup reason for the current access request has a higher access priority than that of the recorded setup reason, the control module 903 invalidates the timer corresponding to the wait time for a CN overload and allows the access request to be sent.

Figure 11:
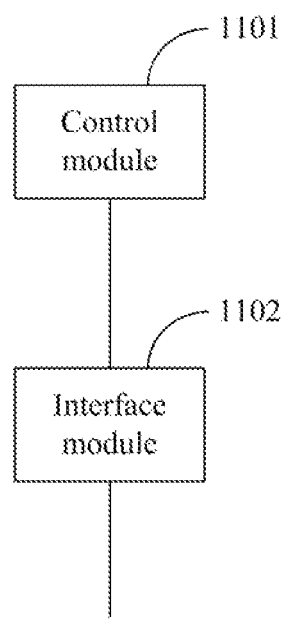
FIG. 11 is a structural diagram of a core network device according to an embodiment of the invention.

Referring to FIG. 11, a core network device in this embodiment includes a control module 1101 and an interface module 1102. The core network device may be an MME or an OAM entity.

The control module 1101 is configured to determine whether the core network device is overloaded, and if so, to determine a wait time for an overload. The control module 1101 may reject an access of some setup reasons according to an overload condition of the core network device and determine an appropriate wait time for these rejected setup reasons.

The interface module 1102 is configured to send to an RAN an overload control message carrying the wait time for an overload.

An MME may determine the wait time according to its own overload condition and overload conditions of other core network nodes and send the wait time to the RAN. An OAM entity may obtain load conditions of respective MMEs and determine hereby the wait time for an overload and then send the wait time to the RAN. The RAN may obtain a plurality of wait times for an overload with respect to a plurality of MMEs. Without distinguishing a single-CN node overload, the RAN may determine a wait time for a CN collectively from the obtained plurality of wait times for an overload, for example, select the maximum one of them, the average value thereof, etc. With a single-CN node overload to be distinguished, the RAN determines the wait time for a CN from a wait time for an overload of an MME with which a UE registers.

In the embodiments of the invention, a Radio Access Network (RAN) determines access control for the RAN and a Core Network (CN) an access procedure, and if there is an access rejecting network, that is, the network is overloaded, the RAN carries in an indication message to a UE a wait time corresponding to the access rejecting network. In other words, the RAN may set targeted wait times respectively for overload conditions of the RAN and the CN to perform better access control and thus avoid as much as possible network congestion and a considerable delay in access of the UE. The embodiments of the invention provide numerous structures of the indication message and may notify the UE of which network is overloaded and the corresponding wait time in these numerous structures to thereby facilitate flexible configuration. Moreover, corresponding implementation solutions are provided for numerous determinations of access control to thereby accommodate a variety of network demands.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program indications. These computer program indications can be loaded onto a general-purpose computer, a specific-purpose computer, an embedded processor or a processor of another programmable data processing device to produce a machine so that the indications executed on the computer or the processor of the other programmable data processing device create means for performing the functions specified in the flow(s) of the flow chart and/or the block(s) of the block diagram.

These computer program indications can also be stored into a computer readable memory capable of directing the computer or the other programmable data processing device to operate in a specific manner so that the indications stored in the computer readable memory create an article of manufacture including indication means which perform the functions specified in the flow(s) of the flow chart and/or the block(s) of the block diagram.

These computer program indications can also be loaded onto the computer or the other programmable data processing device so that a series of operational steps are performed on the computer or the other programmable data processing device to create a computer implemented process so that the indications executed on the computer or the other programmable data processing device provide steps for performing the functions specified in the flow(s) of the flow chart and/or the block(s) of the block diagram.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. An access control method, comprising:
   determining, by a Radio Access Network, RAN, whether a User Equipment, UE, is allowed for an access to the RAN and a Core Network, CN, according to current load conditions of the RAN and the CN and device or service information reported by the UE in an random access procedure; and
   when an access to at least one of the RAN and the CN is rejected, sending, by the RAN, to the UE an indication message carrying a wait time corresponding to the access rejecting network;
   wherein the wait time corresponding to the access rejecting network comprises a wait time for an RAN overload or a wait time for a CN overload or both the wait time for an RAN overload and the wait time for a CN overload;
   wherein without distinguishing a single-CN node overload, the RAN sends the indication message carrying the wait time corresponding to the access rejecting network in an RRC Connection Reject message; and
   with a single-CN node overload to be distinguished, if an access request does not carry a UE identifier corresponding to an MME with which the UE registers, then the method further comprises: receiving an RRC Connection Setup Complete message sent from the UE; and sending by the RAN to the UE the indication message carrying the wait time corresponding to the access rejecting network comprises: if the RRC Connection Setup Complete message carries the UE identifier corresponding to the MME with which the UE registers and the MME corresponding to the UE identifier has an S1 interface with the RAN and is overloaded, or all of MMEs in an MME pool are overloaded, then the RAN sends the indication message carrying the wait time for a CN overload in an RRC Connection Release message; or if the access request carries the UE identifier corresponding to the MME with which the UE registers, the RAN sends the indication message carrying the wait time corresponding to the access rejecting network in the RRC Connection Reject message.

2. The method according to claim 1, wherein the RRC Connection Reject message further comprises an RAN overload indicator indicating whether the RAN is overloaded, or the wait time for an RAN overload, which is a specified value, when the RAN is not overloaded.

3. The method according to claim 1, wherein before the RAN sends to the UE the indication message carrying the wait time corresponding to the access rejecting network, the method further comprises: determining, by the RAN, the wait time for a CN overload by determining by itself for the UE the wait time for a CN overload according to the current load condition of the network and the information reported by the UE, or by determining for the UE the wait time for a CN overload from a wait time, indicated by an MME or an OAM entity, which is further randomized; and determining, by the RAN, the wait time for an RAN overload by determining by itself for the UE the wait time for an RAN overload.

4. A device of radio access network, comprising a memory and one or more processors, wherein the memory stores one or more computer readable program codes, and the one or more processors are used for executing the one or more computer readable program codes to perform:
   a control module configured to determine whether a UE is allowed for an access to the RAN and a CN according to current load conditions of the RAN and the CN and device or service information reported by the UE upon reception of an access request of the UE; and
   an interface module, when an access to at least one of the RAN and the CN is rejected, configured to send to the UE an indication message carrying a wait time corresponding to the access rejecting network;
   wherein the wait time corresponding to the access rejecting network comprises a wait time for an RAN overload or a wait time for a CN overload or both the wait time for an RAN overload and the wait time for a CN overload;
   wherein without distinguishing a single-CN node overload, the RAN sends the indication message carrying the wait time corresponding to the access rejecting network in an RRC Connection Reject message; and
   with a single-CN node overload to be distinguished, if the access request does not carry a UE identifier corresponding to an MME with which the UE registers, then further comprising: receiving an RRC Connection Setup Complete message sent from the UE; and if the RRC Connection Setup Complete message carries the UE identifier corresponding to the MME with which the UE registers and the MME corresponding to the UE identifier has an S1 interface with the RAN and is overloaded, or all of MMEs in a MME pool are overloaded, then the RAN sends the indication message carrying the wait time corresponding to the access rejecting network in an RRC Connection Release message; or if the access request carries the UE identifier corresponding to the MME with which the UE registers, the RAN sends the indication message carrying the wait time corresponding to the access rejecting network in the RRC Connection Reject message.

5. The device of radio access network according to claim 4, wherein the RRC Connection Reject message further comprises an RAN overload indicator indicating whether the RAN is overloaded, or the wait time for an RAN overload, which is a specified value, when the RAN is not overloaded.

6. The device of radio access network according to claim 4, wherein the control module is further configured: to determine the wait time for a CN overload by determining by itself for the UE the wait time for a CN overload according to the current load condition of the network and the information reported by the UE, or by determining for the UE the wait time for a CN overload from a wait time, indicated by an MME or an OAM entity, which is further randomized; and to determine the wait time for an RAN overload by determining by itself for the UE the wait time for an RAN overload.

* * * * *